Feb. 25, 1930. C. W. STEVENS 1,748,314
SANITARY MILKING STOOL AND BUCKET
Filed July 26, 1929
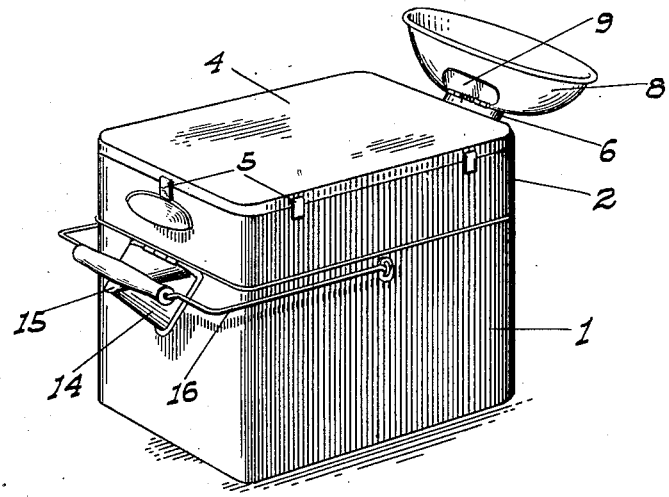
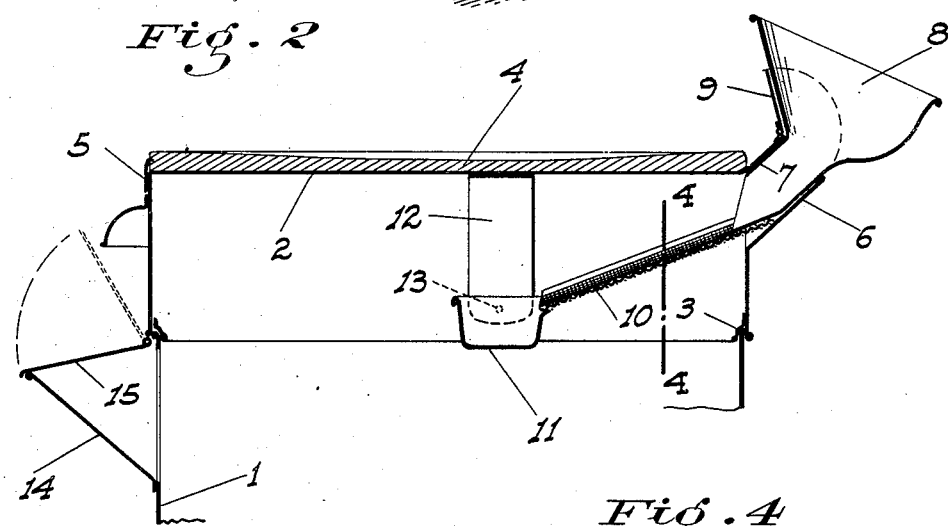
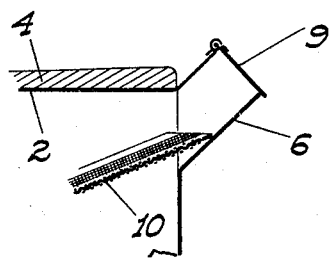
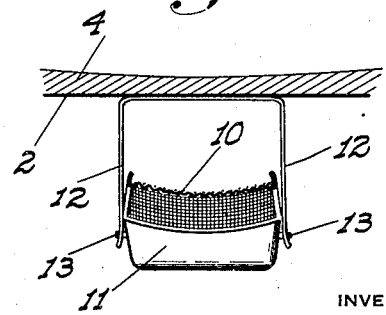
INVENTOR
C. W. Stevens
BY
ATTORNEY Patented Feb. 25, 1930

1,748,314

UNITED STATES PATENT OFFICE

CLARENCE W. STEVENS, OF CERES, CALIFORNIA, ASSIGNOR OF ONE-HALF TO EDWARD L. COLBERT, OF KEYES, CALIFORNIA

SANITARY MILKING STOOL AND BUCKET

Application filed July 26, 1929. Serial No. 381,254.

This invention relates to milkers' accessories; my principal object being to provide a sanitary device arranged to serve both as a stool for the use of the milker during milking operations and as a bucket for the reception of the milk as taken from the cow.

A further object is to construct the device so that the milk as soon as delivered to the bucket is at all times thereafter completely enclosed and protected against contamination by insects, dust or other foreign matter until the milk is later poured from the bucket; and so that the milk as delivered into the bucket will be already in a properly strained condition.

Another object is to construct the device so that the various parts may be easily disassociated from each other so that all such parts may be readily cleaned whenever necessary. The device is therefore very sanitary both in initially protecting the milk as delivered to the same and in enabling the device to be easily kept in a thoroughly clean and fresh condition.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective view of the device with the parts in position ready for milking operations.

Fig. 2 is a fragmentary longitudinal section of the device.

Fig. 3 is a fragmentary longitudinal section showing the milk receiving funnel removed and the cooperating intake passage closed.

Fig. 4 is a fragmentary cross section on the line 4—4 of Fig. 2.

Referring now more particularly to the characters of reference on the drawings the numeral 1 denotes the bucket—a substantial member of suitable non-corrosive sheet metal and preferably of rectangular form and adapted to rest directly on the ground.

A removable lid 2 having a deep flange all around the same fits over the bucket; said flange about its lower edge having a groove 3 to fit snugly over the rim of the bucket so as to form a practically air-tight or at least dirt-tight joint. Resting on top of the lid and the same size as said lid is a rigid seat member 4 such as a board, which is removably held in place by suitable means such as clips 5 projecting up from the lid.

Projecting upwardly at an angle from the lid flange at one end thereof is an intake passage 6, into which removably fits the spout 7 of a funnel or similar shaped member 8. A hinged or flap cover 9 is mounted on the outer end of the passage to close the same when the funnel is removed. Projecting lengthwise of and under the lid at a downward angle from the intake passage is a fine mesh screen of concave cross section. This screen at the passage end removably seats in the lower end of such passage under the adjacent end of the spout (which overhangs this end of the screen somewhat) and at its other end empties into and is rigidly fixed with a relatively small receptacle 11. This receptacle is located in a horizontal plane above the milk holding area of the bucket and is removably held in suspended relation to the lid by suitable means such as spring side plates 12 depending from the lid and detachably engaging pins 13 projecting from the sides of the receptacle.

Mounted in connection with the bucket just below the lid and projecting from the end thereof opposite to the intake funnel is a discharge spout 14, provided with a hinged flap cover 15 normally maintaining the spout closed. A bail 16 is hinged on the bucket just below the lid, the cross member of said bail when not in use resting on the cover 15 so that the bail is prevented from dropping further down, and it also positively holds the lid closed.

In operation the device is carried to the scene and is placed so that the funnel is under the bag of the cow to be milked. The milker seats himself on the stool in straddling relation to the device and milks the cow in the usual manner. The milk falls into the funnel and flows down the spout and onto the screen 10 before dropping into the bucket. Any foreign matter such as small pieces of straw and the like which may pass into the funnel along with the milk are therefore strained out of the same before said milk is actually deposited in the bucket; and such matter is caught by the screen and deposited in the receptacle 11, which as above stated is above the milk holding area of the bucket. When the milking operations are completed the funnel is removed so that the lid 9 will close the intake passage and the device is carried by means of the bail to the point where the main bulk milk cans are located. The milk is then poured from the bucket into a can without removing the lid 2 by means of the spout 14. Said lid may then be removed, which enables the screen and catch receptacle unit to be also removed and all the parts may then be easily washed out, as will be evident.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A milker's device including a covered bucket, an intake passage to the bucket, screening means between said passage and the bottom of the bucket, and a catch receptacle to which said screening means leads disposed above the milk holding area of the bucket.

2. A milker's device including a bucket, a removable lid for the same, an intake passage projecting upwardly from the lid, and a screen and catch receptacle unit mounted in removable connection with the lid, the screen being positioned to initially receive the milk discharging from the lower end of the passage.

In testimony whereof I affix my signature.

CLARENCE W. STEVENS.